US005482378A

United States Patent [19]
Vona, Jr. et al.

[11] Patent Number: 5,482,378
[45] Date of Patent: Jan. 9, 1996

[54] VACUUM MOTOR BERING PROTECTION SYSTEM

[75] Inventors: Nick Vona, Jr., Uniontown; George E. Marsinek, Kent, both of Ohio

[73] Assignee: Ametek, Inc., Kent, Ohio

[21] Appl. No.: 263,823

[22] Filed: Jun. 22, 1994

[51] Int. Cl.$^6$ ............................................. F16C 33/72
[52] U.S. Cl. ........................... 384/134; 277/3; 384/478; 384/135; 384/130; 384/479
[58] Field of Search ................................. 384/134, 478, 384/135, 130, 479; 277/3

[56] References Cited

U.S. PATENT DOCUMENTS

| | | | |
|---|---|---|---|
| 3,347,604 | 10/1967 | Lavelle et al. | 384/134 |
| 4,586,830 | 5/1986 | Carter | 384/134 |
| 4,992,023 | 2/1991 | Baker et al. | 384/478 |
| 5,346,361 | 9/1994 | Jurgill et al. | 277/3 |

Primary Examiner—Lenard A. Footland
Attorney, Agent, or Firm—Renner, Kenner, Greive, Bobak, Taylor & Weber

[57] ABSTRACT

A vacuum motor bearing protection system includes a barrier wall interposed between a motor assembly and a fan assembly. A shaft interconnecting the assemblies is rotatably received within a bearing received by the barrier wall. In order to prevent moisture and debris from attacking the bearing, apertures are position in the top plate of the fan assembly nearest the bearing and in juxtaposition thereto for drawing air away from the bearing and into the fan eye. Accordingly, this scavenging action draws any moisture or debris from the area of the bearing. To assist in the pumping action, the barrier wall, fan top plate, or a spacer interposed therebetween may be provided with vanes positioned and configured to direct moisture laden air to the apertures in the fan top plate and into the fan eye.

20 Claims, 2 Drawing Sheets

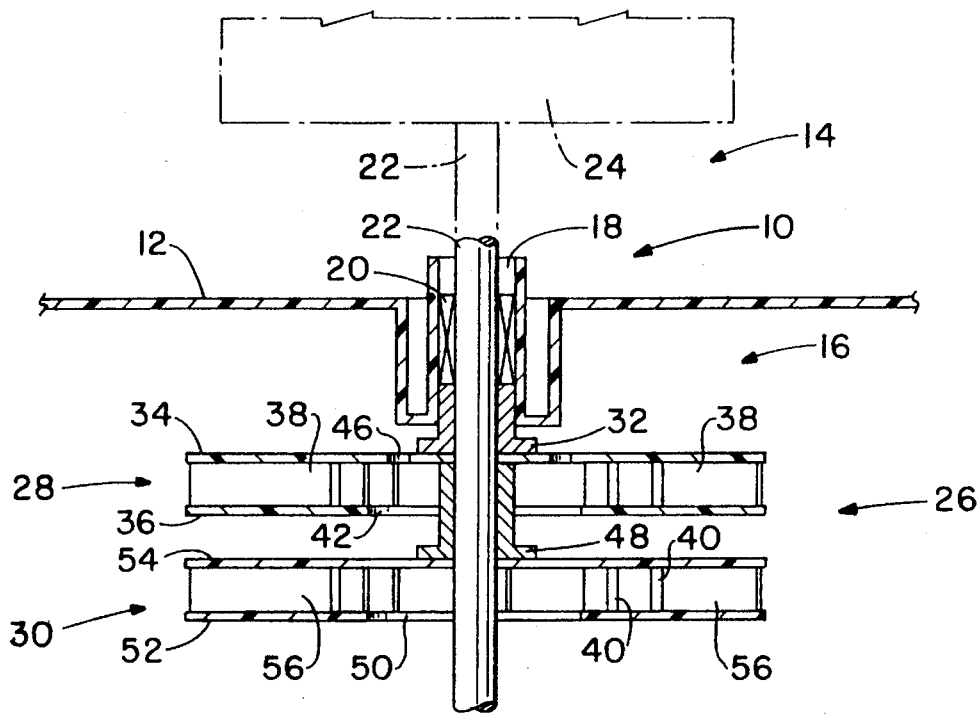
FIG.-1
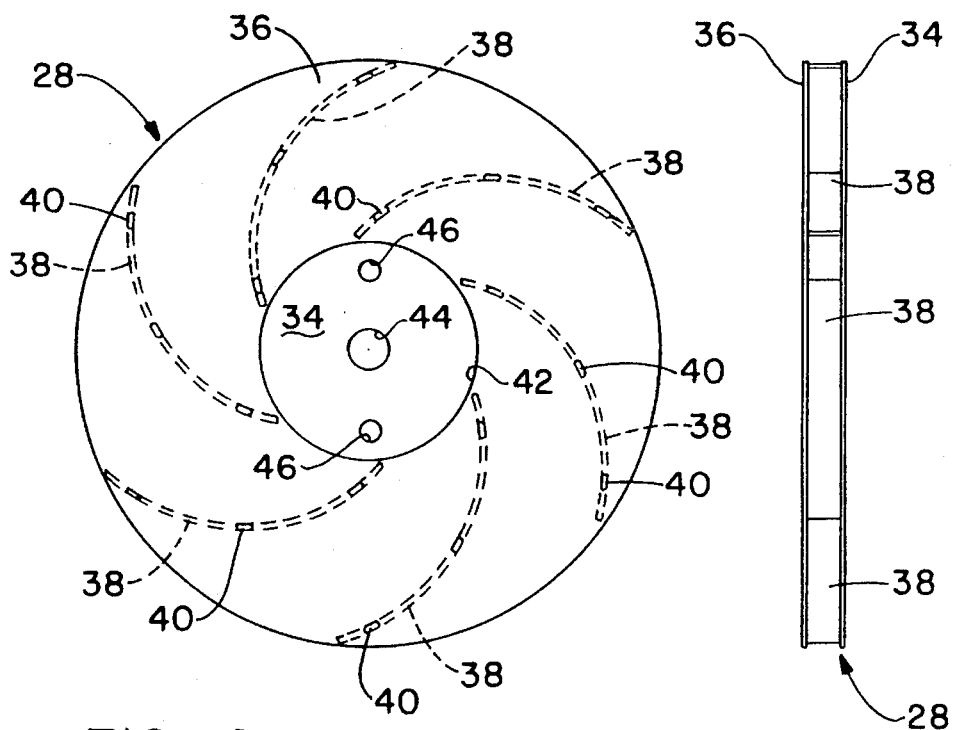
FIG.-2
FIG.-3

VACUUM MOTOR BERING PROTECTION SYSTEM

TECHNICAL FIELD

The invention herein resides in the art of vacuum motors and, more particularly, to the type employed in jet spray extractor cleaners such as carpet cleaners and the like. Specifically, the invention relates to vacuum motors employing means for protecting the fan/motor shaft bearing from effluent such as water, soap, foam, or the like.

BACKGROUND ART

The use of jet spray extractors for cleaning carpets and the like is now well known. Such jet spray extractors typically employ a motor maintained within a motor housing and having a shaft passing therefrom through a barrier wall to a fan maintained within a fan housing. An appropriate bearing is typically maintained within the barrier wall for receipt of the shaft interconnecting the motor and fan. With the fan generating a vacuum for extracting moisture and dirt from the carpet, an environment of dirt laden air, water, detergent, and foam is present within the chamber receiving the fan. With the shaft bearing being maintained within the wall separating the fan and motor housings, the bearing is in close proximity to such environment and, absent means for protecting or isolating the bearing from the environment, it often becomes subjected to that environment and fails as a result. The moisture, detergent, and foam attacks the lubricant of the bearing, causing the same to fail.

The prior art has taught the use of air seals to provide an air flow for isolating the bearing from the adverse environment. Such air seals work well and are widely used in commercial units where added expense is small in comparison to the overall unit cost. However, in lower cost household units the added protection of the air seal is considered cost prohibitive in most cases.

Other methods have been considered for protecting the motor/fan shaft bearing. These have included seals, labyrinths, and vanes on the housing near the backside of the fan. However, even these structures and techniques result in increased costs, typically not justified in the lower cost household units.

DISCLOSURE OF INVENTION

In light of the foregoing, it is a first aspect of the instant invention to provide a vacuum motor bearing protection system for use in an effluent vacuum device which provides a level of protection for the shaft bearing that is appropriate for a household appliance.

Another aspect of the invention is the provision of a vacuum motor bearing protection system for use in an effluent vacuum device which eliminates the need for complex and costly seals, vanes, and labyrinths.

A further aspect of the invention is the provision of a vacuum motor bearing protection system for use in an effluent vacuum device which is highly effective and cost efficient for implementation in household or consumer extractor units.

Yet an additional aspect of the invention is the provision of a vacuum motor bearing protection system for use in an effluent vacuum device which provides an effective bearing seal by the application of apertures in the fan plate nearest the bearing.

Still a further aspect of the invention is the provision of a vacuum motor bearing protection system for use in an effluent vacuum device which enhances the bearing seal by the inclusion of exterior fan blades adjacent the bearing.

Still another aspect of the invention is the provision of a vacuum motor bearing protection system for use in an effluent vacuum device which enhances the bearing seal by the inclusion of vanes extending from the motor housing adjacent the fan and bearing.

Yet an additional aspect of the invention is the provision of a vacuum motor bearing protection system for use in an effluent vacuum device which enhances the bearing seal by the inclusion of vanes on a spacer interposed between the fan and bearing.

The foregoing and other aspects of the invention which will become apparent as the detailed description proceeds are achieved by a vacuum motor bearing protection system, comprising: a barrier wall; a motor on one side of said wall; a shaft extending from said motor, passing through said wall, and rotatable within a bearing; and a fan received upon said shaft on a side of said wall opposite said motor, said fan comprising a top plate and a bottom plate with arcuate vanes interposed therebetween, said bottom plate having a central opening for drawing air from outside of said fan into said vanes and said top plate having at least one aperture therein for drawing air from an area adjacent said bearing and into said vanes.

Still other aspects of the invention which will become apparent herein are attained by the improvement of a bearing protection system in a vacuum generating device having a motor maintained on a first side of a wall and a shaft extending from the motor through the wall and receiving a fan on a second side of the wall, the shaft rotating within a bearing maintained within the wall, such improvement comprising: a pair of apertures passing through a top plate of the fan, said apertures being diametrically opposed with respect to the shaft, said apertures being in juxtaposition to the bearing.

DESCRIPTION OF DRAWINGS

For a complete understanding of the objects, techniques, and structure of the invention reference should be made to the following detailed description and accompanying drawings wherein:

FIG. 1 is a partial sectional view of a fan and bearing assembly according to the invention as the same is used in a jet spray extractor;

FIG. 2 is a bottom plan view of fan employed in the embodiment of FIG. 1;

FIG. 3 is a side elevational view of the fan of FIG. 2;

BEST MODE FOR CARRYING OUT THE INVENTION

Figure 4:
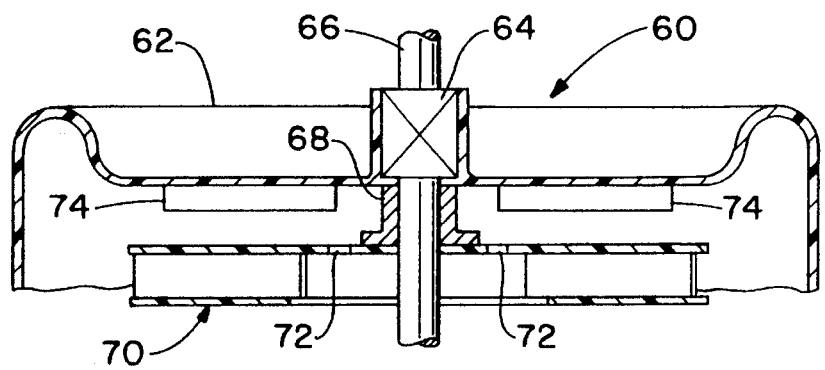
FIG. 4 is a cross sectional view of a second embodiment of a vacuum motor bearing protection system according to the invention.

Referring now to the drawings and more particularly FIG. 1, it can be seen that a vacuum motor bearing protection system is designated generally by the numeral 10. As shown, a motor housing 12 provides, in pertinent part, a barrier wall between a motor chamber 14 and a fan chamber 16. A bore 18 passes through the motor housing 12 and receives an appropriate bearing 20 therein. The bearing 20 may be of any suitable type such as a sleeve bearing, ball bearing assembly, or the like. In any event, the bearing 20 receives a shaft 22 which interconnects a motor 24 within the motor chamber 14 and a fan 26 maintained within the fan chamber 16. In the preferred embodiment of the invention, the fan 26 comprises a plurality of stacked fan elements or layers 28, 30 as shown.

As is well known to those skilled in the art, the motor chamber 14 is isolated by a barrier wall of the motor housing 12 from the fan chamber 16. Accordingly, the motor 24 is not subjected to the environment of the fan chamber 16. Indeed, the motor chamber 14 will typically receive and pass motor cooling air across the motor 24, such air being from the ambient and of a clean and dry nature. In contradistinction, the fan chamber 16 will typically receive the working air of the assembly, such as a jet spray extractor, employing the vacuum motor bearing protection system 10. Accordingly, the fan chamber 16 will contain an environment of liquid, foam, detergent, and dirt. It is, of course, most desirable to isolate the bearing 20 from such environment.

As shown in FIG. 1, an appropriate spacer 32 is interposed between the bearing 20 and the closest fan element 28. Further, and as is customary in the art, a nut, keeper, or the like is secured to the shaft 22 opposite the fan element furthermost from the spacer 22 such that the fan elements are maintained in fixed position along the shaft 22 in stacked relationship. The total number of fan elements is, accordingly stacked between the spacer 32 and an appropriate nut or keeper engaging the shaft 22.

As shown, the fan element 28 comprises a top plate or disk 34 and a bottom plate or disk 36 having a plurality of arcuate vanes 38 interposed therebetween. The vanes 38 are preferably curved backward with respect to rotation, but may be cupped in the direction of rotation, as is well known to those skilled in the art. In similar fashion, the fan element 30 would include a corresponding top and bottom plate with similar arcuate vanes sandwiched therebetween.

As best shown in FIGS. 2 and 3, rivets 40 extend from the arcuate vane 38 and through the top and bottom plates 34, 36 for purposes of securing the vanes 38 in appropriate position. As further shown in FIGS. 1 and 2, an annular opening 42 is provided in the bottom plate 36 to create an eye of the associated fan element 28. Air is drawn from outside of the fan element and into the vanes between the plates 34, 36, from which the air is exhausted. As further shown in FIG. 2 and as is apparent in FIG. 1, an aperture 44 is provided in the plate 34 for receiving the shaft 22 interconnecting the motor 24 with the fan assembly 26.

Those skilled in the art will appreciate that a spacer 48 is received upon the shaft 22 and interposed between the fan 28 and the fan 30 to maintain an appropriate spacing therebetween. As with the fan 28, the fan 30 has an annular opening 50 in the bottom plate 52 thereof. A top plate 54 is parallel to the bottom plate 52 such that the arcuate vanes 56 may be maintained therebetween in much the same fashion as the vanes 38 are maintained within the fan 28. An aperture in the top plate 54 receives the shaft 22 in tight fitting relation. Additionally, the spacer 48 may serve to seal such aperture.

Those skilled in the art will readily appreciate that additional fan elements similar to the fan element 30 may also be positioned upon the shaft 22, the same being axially displaced therealong. For purposes of simplicity, only two fan elements 28, 30 have been shown. It will further be appreciated by those skilled in the art that the fan elements 28, 30 are secured to the shaft 22 and rotatable therewith so that air is drawn through an inlet into the fan chamber 16 at a point beneath the fan assembly 26. The air winds in serpentine fashion sequentially through the fan elements spaced along the shaft 22 until reaching the uppermost fan element 28 from which it is exhausted through an exhaust port in the housing defining the fan chamber 16.

As shown in FIG. 1, air is drawn into the eye of the fan 30 defined by the annular opening 50 and then is dispelled outwardly from the fan along the arcuate vanes 56. The air so disbursed is then attracted by the eye of the fan 28 defined by the lower aperture 42. That air is similarly drawn into the vanes 48 and discharged radially outwardly along the vanes 38 and ultimately to an exhaust port of the fan chamber 16.

As an important feature of the instant invention, apertures 46 are provided in the top plate 34 of the fan 28. Preferably, the apertures 46 are uniformly circumferentially spaced about the aperture 44 receiving the shaft 22. While two such apertures 46 are shown and preferred, it will be understood that other numbers of such apertures 46 may be provided. In any event, it is most desired that the apertures 46 be interposed in juxtaposition to the bearing 20 and the spacer 32 interposed between the bearing 20 and the top plate 34. Additionally, and as will be readily appreciated by those skilled in the art, with the apertures 46 being closer to the shaft 22 than the outer circumference of the aperture 42, the apertures 46 fall within the eye of the fan.

Those skilled in the art will readily appreciate that the apertures 46 allow the negative pressure generated in the eye of the fan during rotation of the fan 28 to draw in water or foam that has found its way between the top plate 34 and the motor housing 12 back into the working side or inside of the fan 28. In other words, water or foam which would otherwise approach the bearing 20 is drawn through the apertures 46 into the eye of the fan and away from the bearing 20 and spacer 32. Accordingly, any liquid or foam that would otherwise damage the bearing 20 is pulled to the inside of the fan and thus can do no damage.

It has been found that the effectiveness of the scavenging or pumping action of the apertures interposed into the top plate of the topmost fan in the fan stack is dependent upon the number and location of the holes 46, the size of the holes, and the operating speed of the fan. Of course, the amount of foam or water which has found its way to the backside of the fan is also a factor which impacts the effectiveness of the system just described.

It will be appreciated that the scavenging system of the invention operates only when the fan is running. Accordingly, if the system employing the motor 24 and fan 26 is tipped such that foam and water attacks the bearing 20 and the fan is not operated, damage to the bearing may result despite the scavenging system just described. However, once the motor is energized, the fan assembly 28 with the holes 46 will pump away effluent from the area about the shaft 22, spacer 32, and bearing 20. Indeed, the instant invention provides a method of reducing the potential damage to a bearing in a system such as that described, as well as to reduce the possibility of a shaft seal area leak in any application that involves a rotating impeller that has the bearing on the opposite side of the fan eye. Fan units which are employed for picking up liquids such as jet spray extractors and wet/dry vacuum units may particularly benefit from the invention just described.

The pumping action to scavenge the liquid and foam from the area of the bearing 20 on the back side of the top fan 28 may be facilitated by various changes to the basic theme of the invention. For example, and by reference to FIG. 4, it can be seen that a vacuum motor bearing protection system in accordance with the invention is designated by the numeral 60. Here, a motor housing 62 receives a bearing 64 having a motor/fan shaft 66 passing therethrough as with the embodiment of FIG. 1. A spacer 68 is interposed between the housing 62 and a fan 70. As discussed above, the top plate of the fan 70 is provided with apertures 72 for purposes of drawing foam or liquid away from the bearing 64 and toward the eye of the fan 70. The system 60 is also provided with a plurality of vanes 74 extending downwardly from the housing 62 and interposed in the space between the housing 62 and the top plate of the fan 70. Preferably, the vanes 74 are arcuate, although it has been found that linear vanes are suitable for enhancing the pumping action of the apertures 72 during rotation of the fan 70. The radially disposed vanes 74 seek to direct the foam and water inwardly toward the eye of the fan 70 for entry therein through the apertures 72.

Figure 5:
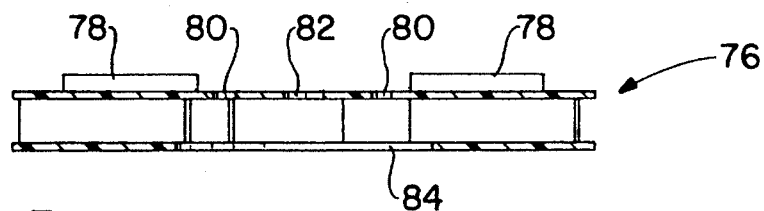
FIG. 5 is a cross sectional view of a fan assembly employed in a third embodiment of the invention.

In yet another embodiment of the invention, it is contemplated that a vacuum motor bearing protection system may employ a fan 76 such as that depicted in FIG. 5. In this embodiment, the top plate of the fan 76 is provided with a plurality of upwardly extending vanes or ribs 78 which are displaced radially outwardly from the apertures 80 positioned on either side of the hole 82 provided for the shaft 66. Again, and in standard fashion, an air passage opening 84 is provided within the bottom plate of the fan 76 and having a diameter preferably greater than the separation of the apertures 80. It has been found with the structure of FIG. 5 that the vanes 78 on the top plate of the fan 76 enhance the pumping action by directing liquid and foam radially inwardly toward the apertures 80, for passage into the eye of the fan 76. It will be appreciated that the vanes 78 may be substantially similar to the vanes 74 in the embodiment of FIG. 4, but for the positioning of the vanes upon the fan itself, rather than the housing. Indeed, in the embodiment of FIG. 5, it is contemplated that the vanes 78 will push the effluent to the outer edge of the top fan plate, likely eliminating the need for the aperture 80.

Figure 6:
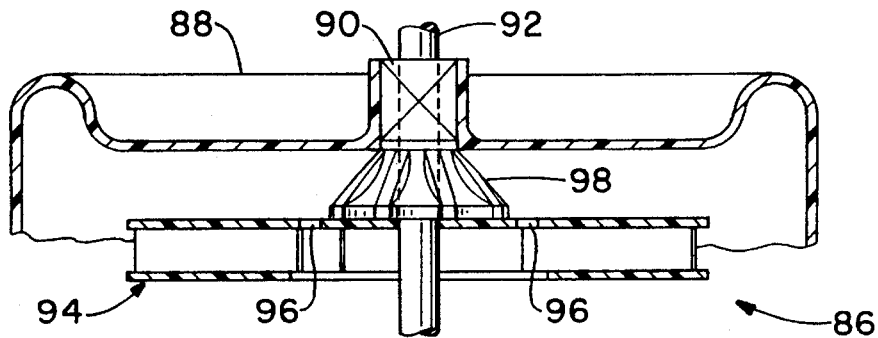
FIG. 6 is a cross sectional view of a vacuum motor bearing protection system according to a fourth embodiment of the invention.
Figures 7, 8:
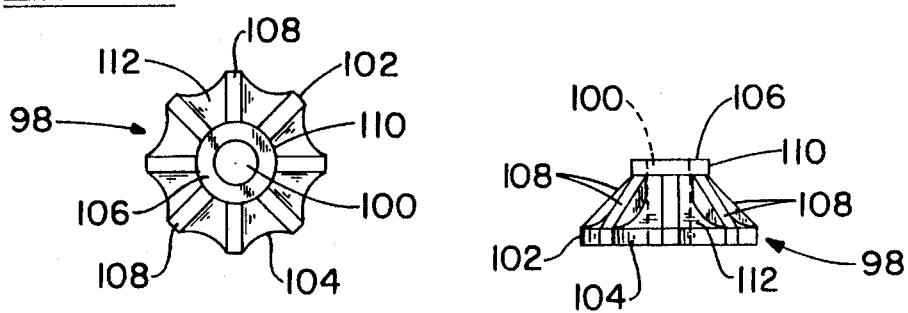
FIG. 7 is a top plan view of a spacer employed in the embodiment of FIG. 6.
FIG. 8 is a side elevational view of the spacer of FIG. 7.

With reference now to FIGS. 6–8, an appreciation of a vacuum motor bearing protection system 86, consistent with the theme of the instant invention, may be attained. Here, a motor housing 88 maintains a bearing 90 which, in turn, receives a fan/motor shaft 92. While the motor is not shown in the illustration of FIG. 6, it will be appreciated that such motor would be on the opposite side of the housing 88 from the fan 94, which is shown as mounted to the shaft 92. As discussed above, a plurality of apertures 96 are uniformly spaced about the centerpoint of the top plate of the fan 94.

A spacer 98 is, in standard fashion, interposed between the housing 88 or bearing 90 and the fan 94. In the embodiment of FIGS. 6–8, the spacer 98 is uniquely configured to assist in the bearing seal technique of the instant invention by enhancing the pumping or scavenging action attained by the apertures 96 in the fan 94. The spacer 98 is provided with an axial bore 100 for receiving the shaft 92. A disk-shaped base 102 at the bottom of the spacer 98 and in contacting engagement with the top plate of the fan 94, is substantially disk-shaped with a scalloped periphery. The top 106 of the spacer 98 is substantially of an annular disk shape, and is adapted for engagement with the housing 88 or bearing 90.

A plurality of vanes or ribs 108 extend angularly upwardly from the base 102 to the outer sidewall of the cylindrical body portion 110 which is interposed between the top 106 and base 102. A plurality of currate surfaces 112 extend as webs between the vanes or ribs 108 from the cylindrical body portion 110 to the scalloped periphery 104.

When the fan 94 is caused to rotate, the scavenging by the apertures 96 is facilitated and enhanced by the vanes or ribs 108 which extend downwardly and radially outwardly from the area of the bearing 90 toward the apertures 96, and by the currate surfaces 112 interposed therebetween and similarly providing a chute for such moisture and associated debris.

It should now be apparent that the instant invention contemplates the provision of scavenging apertures in the top plate of the top fan assembly and in juxtaposition to the bearing interposed between the fan and motor assemblies. The apertures are positioned within the eye of the fan so as to draw moisture, liquid, or debris from an area adjacent the fan/motor bearing and into the low pressure of the fan eye. Such material is then disbursed through the exhaust port of the unit along with the other exhaust air. Vanes may be added to the housing, fan, or the spacer interposed therebetween to assist in the scavenging and pumping action for removal of such damaging material.

Thus it can be seen that the objects of the invention are satisfied by the structure presented above. While in accordance with the patent statutes only the best mode and preferred embodiment of the invention has been presented and described in detail, it is to be understood that the invention is not limited thereto or thereby. Accordingly, for an appreciation of the true scope and breadth of the invention reference should be made to the following claims.

What is claimed is:

1. A vacuum motor bearing protection system, comprising:

a barrier wall;

a motor on one side of said wall;

a shaft extending from said motor, passing through said wall, and rotatable within a bearing; and a fan received upon said shaft on a side of said wall opposite said motor, said fan comprising a top plate and a bottom plate with arcuate vanes interposed therebetween, said bottom plate having a central opening for drawing air from outside of said fan into said vanes and said top plate having at least one aperture therein for drawing air from an area adjacent said bearing and into said vanes.

2. The vacuum motor bearing protection system according to claim 1, wherein said aperture is in juxtaposition to said bearing.

3. The vacuum motor bearing protection system according to claim 2, further comprising a spacer interposed between said fan and said bearing and maintaining said fan and bearing in fixed spaced relationship.

4. The vacuum motor bearing protection system according to claim 3, wherein said spacer receives said shaft and has a first larger diameter end adjacent said top plate and a second smaller diameter end adjacent said bearing.

5. The vacuum motor bearing protection system according to claim 4, wherein said spacer further comprises a plurality of ribs circumferentially spaced about said spacer and extending from said first larger diameter end to an area adjacent said second smaller diameter end.

6. The vacuum motor bearing protection system according to claim 5, wherein said spacer further comprises currate surfaces extending between and interconnecting adjacent pairs of said fibs.

7. The vacuum motor bearing protection system according to claim 3, wherein said top plate of said fan is characterized by a plurality of ribs extending from said top plate towards said barrier wall.

8. The vacuum motor bearing protection system according to claim 7, wherein said ribs are arcuate.

9. The vacuum motor bearing protection system according to claim 8, wherein said ribs are uniformly circumferentially and radially spaced upon said top plate with respect to said shaft.

10. The vacuum motor bearing protection system according to claim 3, wherein said barrier wall is characterized by a plurality of ribs extending therefrom toward said top plate.

11. The vacuum motor bearing protection system according to claim 10, wherein said ribs are arcuate.

12. The vacuum motor bearing protection system according to claim 11, wherein said ribs are uniformly circumferentially and radially spaced upon said barrier wall about said shaft.

13. In a vacuum generating device having a motor maintained on a first side of a wall, and a shaft extending from the motor through the wall and receiving a fan on a second side of the wall, the shaft rotating within a bearing maintained within the wall, the improvement of a bearing protection system, comprising:

a pair of apertures passing through a top plate of the fan, said apertures being diametrically opposed with respect to the shaft, said apertures being in juxtaposition to the bearing.

14. The improvement of a bearing protection system in a vacuum generating device according to claim 13, further comprising a plurality of vanes extending from said top plate toward the wall.

15. The improvement of a bearing protection system in a vacuum generating device according to claim 14, wherein said vanes are arcuate.

16. The improvement of a bearing protection system in a vacuum generating device according to claim 13, further comprising a plurality of vanes extending from the wall toward said top plate.

17. The improvement of a bearing protection system in a vacuum generating device according to claim 13, further comprising a spacer interposed between the bearing and the fan, said spacer comprising a spool received on the shaft, said spool having a first larger end adjacent the fan and a second smaller end adjacent the bearing, said first and second ends interconnected by a cylindrical body member.

18. The improvement of a bearing protection system in a vacuum generating device according to claim 17, wherein said spacer further comprises uniformly spaced ribs extending from said cylindrical body member to said first end.

19. The improvement of a bearing protection system in a vacuum generating device according to claim 18, further comprising currate surfaces interconnecting adjacent pairs of said ribs.

20. The improvement of a bearing protection system in a vacuum generating device according to claim 19, wherein said first end of said spacer has a scalloped periphery.

* * * * *